Feb. 10, 1970 F. A. PERKINS, JR., ET AL 3,495,184

PHASE-LOCKED LOOP HAVING IMPROVED ACQUISITION RANGE

Filed March 11, 1968

INVENTORS
FRANK A. PERKINS, Jr.
& GERALD S. DUGGAN

BY Hurvitz, Rose & Greene

ATTORNEYS

United States Patent Office 3,495,184
Patented Feb. 10, 1970

3,495,184

PHASE-LOCKED LOOP HAVING IMPROVED ACQUISITION RANGE

Frank A. Perkins, Jr., Melbourne, and Gerald S. Duggan, Palm Bay, Fla., assignors to Radiation Incorporated, Melbourne, Fla., a corporation of Florida Filed Mar. 11, 1968, Ser. No. 712,129
Int. Cl. H03b *3/04*
U.S. Cl. 331—10 7 Claims

ABSTRACT OF THE DISCLOSURE

A phase-locked loop has the usual phase detector, low pass filter and voltage-controlled oscillator, in which the oscillator provides a local reference signal whose phase is compared with the incoming signal to provide a phase error signal from the detector. The phase error signal is utilized to determine the polarity of the frequency offset between incoming signal and local reference signal, and the filtered phase error signal is adjusted in magnitude according to the frequency offset polarity, in a sense tending to reduce the frequency offset when the adjusted phase error signal is applied to the voltage-controlled oscillator.

BACKGROUND OF THE INVENTION

The present invention relates generally to synchronous detectors, and more particularly to synchronous detectors employing phase lock circuitry.

As is well known, the detector of a receiver is employed to extract modulation from the carrier, and is frequently required to perform that task in instances where the signal is actually or virtually buried in noise. In such instances it may be desirable to employ a synchronous detector in which the phase of the reference signal is automatically synchronized to the incoming signal in a manner somewhat analogous to autocorrelation. A phase-lock circuit is generally used in the synchronous detector to maintain the phase of a voltage-controlled reference oscillator in synchronism with the phase of the incoming signal, thereby providing a relatively sensitive system. The improvement in sensitivity over many other types of detectors s obtained by virtue of the vast reduction in the amount of noise present in the loop, since the bandwith of the phase-locked loop itself need only be sufficiently wide to permit passage of the difference between the signalf requency and the frequency of the voltage-controlled oscillator.

In the typical phase-locked loop, shown in FIGURE 1, the input signal is applied to a phase detector, mixer, or multiplier, 10, for production of a voltage proportional to the phase difference or error between that signal and a local reference signal supplied by a voltage-controlled oscillator (VCO) 15. The error signal is filtered by a low-pass loop filter 13, and is then applied as a control voltage to the control terminal of the voltage-controlled oscillator. The VCO in turn generates an output signal whose frequency is proportional to its input voltage; hence, the filtered error signal varies the frequency, and therefore the phase, of the local reference signal applied to the phase detector. The loop polarities are such that a given phase error signal produces a frequency change in a direction that tends to reduce the phase error toward zero.

Numerous applications exist for the phase-locked loop in the field of communications and data processing, as in the demodulation of incoming signal and the extraction of timing information therefrom. As previously stated, an important characteristic of the phase lock circuit is its ability to minize the effect of disturbances such as noise or interference on the input signal. Also as previously stated, this is primarily a function of the bandwidth of the low pass filter, in passing the difference signal between the incoming signal frequency and the local reference frequency produced by the voltage-controlled oscillator. Obviously, as the bandwith of the low pass filter is reduced, the noise rejection capability of the phase lock circuit is correspondingly improved.

The phase-locked loop also has the important capability of acquiring a phase lock with an input signal displaced in frequency from the reference signal. As a general proposition, the range of frequencies over which lock can be acquired by the loop is again a function of the low pass filter characteristics, the acquisition range decreasing as the noise rejection is improved. Consequently, it will be appreciated that the design of phase-locked loops usually involves a comprise between the acquisiton and noise rejecton requirements of the system.

It is a principal object of the present invention to provide phase-lock circuitry for improving the acquisition range without penalty to the noise rejection capablities of such loops.

SUMMARY OF THE INVENTION

Briefly, according to the present invention, the polarity of (i.e., sense of) the frequency displacement or frequency offset between incoming signal to the phase-locked loop and local reference signal is determined by examining the phase error or phase difference signal for abrupt changes between large positive and large negative values. That is, an abrupt change from a large negative phase error to a large positive phase error is indicative of a positive frequency offset, while abrupt change in the opposite direction is indicative of a negative frequency offset. According to an embodiment of the invention, these abrupt changes are ascertained by initially detecting large positive and negative phase errors, using slicing networks or other threshold detecting devices, and observing the rapidity of any change using coincident circuits preceded by networks for delaying the observed "old" error polarity while the "new" error polarity is being sampled.

BRIEF DESCRIPTION OF THE DRAWING

The above and still further objects, features and attendant advantages of the present invention will become apparent from a consideration of the following detailed description of a preferred embodiment thereof, especially when taken in conjunction with the accompanying drawings in which.

PREFERRED EMBODIMENTS OF THE INVENTION

Figure 1:
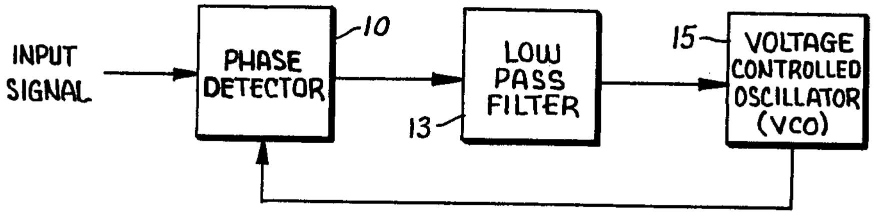
FIG. 1 PRIOR ART
FIGURE 1 is a block diagram of the basic prior art phase-locked loop, hereinbefore described.
Figure 2:
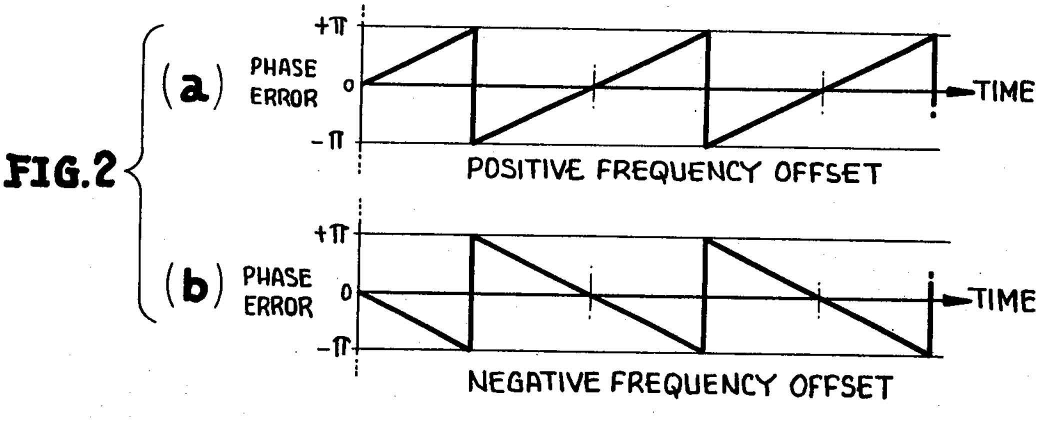
FIGURE 2 is a graph of phase error versus time for a phase-locked loop which is out of lock, FIGURE 2(*a*) illustrating the positive frequency offset, and FIGURE 2(*b*) the negative frequency offset, versus time.

Referring now to FIGURE 2, when the phase-lock loop is out of lock, i.e., out of synchronism with the incoming signal, the phase error as a function of time is a sawtooth waveform. While in actuality the true phase difference continuously grows with time during the out-of-lock condition, the phase error to be considered at any time is confined by definition to the range from minus pi ($-\pi$) radians to plus pi ($+\pi$) radians. Should the phase error be slightly greater than $+\pi$, it is interpreted as a negative error, and similarly, a phase error slightly greater than $-\pi$ is treated as a positive error.

The out-of-lock condition of the loop may be observed or determined from the behavior of the phase error signal itself, by noting that the error signal polarity undergoes changes while the magnitude of the error signal is relatively large. For a phase-locked condition, on the other hand, the polarity changes of the error signal are always accompanied by a rather small signal magnitude. Moreover, the polarity of the frequency offset can be determined from the polarity of the phase error signal either before or after the change in polarity with large error magnitude.

Referring specifically to FIGURE 2(*a*), an abrupt change from a large positive to a large negative error is indicative of a positive frequency offset, while as shown in FIGURE 2(*b*), an abrupt change from large negative to large positive error is indicative of a negative frequency offset. From a knowledge of the polarity of frequency offset, the local frequency output of the VCO may be changed to appropriately reduce the frequency offset, thus allowing the loop to lock to signals outside its normal acquisition range. This may be achieved, it will be noted, without any reduction in the noise rejection capability of the loop. Alternatively, the loop bandwidth may be reduced, improving the noise rejection, while maintaining the original acquisition range, if desired.

According to the principal aspect of the present invention, means are provided by which to detect the polarity of the frequency offset from the polarity of the phase error signal in the loop, and this information is supplied to further means for appropriately varying the frequency of the voltage to the VCO, whereby to reduce the frequency offset and improve the acquisition range of the phase-locked loop.

Figure 3:
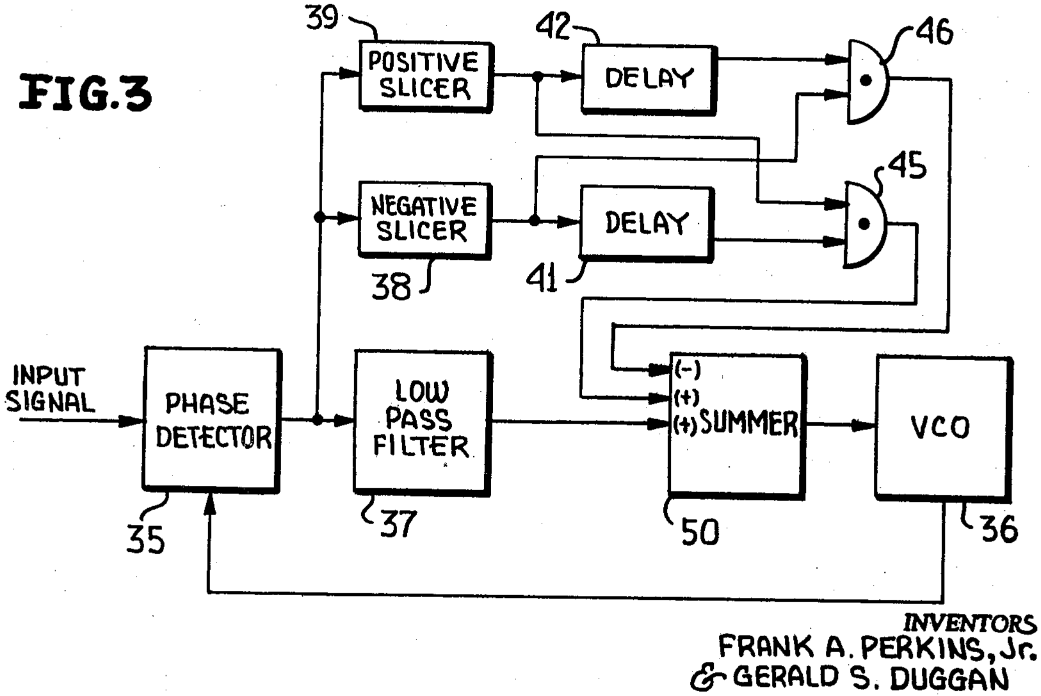
FIGURE 3 is a block diagram of a phase-locked loop circuit according to the present invention.

In a preferred embodiment, such means are provided in a phase-lock loop circuit as shown in FIGURE 3. A phase detector 35 is connected to receive the input signal under observation and to receive, at a further input terminal, the local reference signal supplied by voltage controlled oscillator 36. The output terminals of phase detector 35 are connected to the usual low pass filter 37 and in parallel to the input circuits of a negative slicer 38 and positive slicer 39. As is well known, a slicer is an amplitude gate, producing an output only when the input signal lies above a preset threshold valve. Positive slicer 39 produces an output when the phase error signal has a value greater than some predetermined positive reference level, that is to say, when the error signal has a large positive value. Similarly, the negative slicer 38 produces an output only for a large negative phase error, greater than a predetermined negative reference level.

The output terminals of each slicer are connected to the input terminals of an AND gate in the opposite slicer channel, slicer 39 connected to AND gate 45 and slicer 38 to AND gate 46, and, as well, to another input circuit of the AND gate in its own channel via a delay network, 41 for negative slicer 38, and 42 for positive slicer 39.

The output circuit of each of AND gates 45 and 46 is connected to a respective input circuit of a combiner network, designated as summing circuit 50, along with the output signal from low pass filter 37. The combiner network 50 serves to add or subtract the output of the respective AND gate to or from the output signal obtained from the low pass filter, according to the input terminal to which the gate output is fed, as a control voltage to the VCO.

In operation of the circuit of FIGURE 3, phase detector 35 receives input signal together with local reference signal and supplies a control signal representative of phase error to each of low pass filter 37, negative slicer 38 and positive slicer 39. An output signal from the positive slicer is indicative of a phase error signal having a large positive value, while an output signal from the negative slicer is indicative of the error signal having a large negative magnitude. The output signal of each slicer is delayed in the delay unit of its respective channel and compared to the output of the opposite slicer in the AND gates. It is essential that the magnitude of the delay introduced in the output signal of the slicers by the delay units be sufficiently short to prevent an output signal from the AND gates during the slow reversal of error polarity (the ramp portion of the function shown in FIGURE 2). To this end, the delay introduced by each delay unit must be less than the time interval required for the phase error to pass from the preset slicer threshold level to zero on the ramp or gentle slope of the sawtooth waveform of phase error versus time (FIGURE 2), at the maximum frequency offset. On the other hand, the delay must be sufficiently long to provide a sample of the "new" error polarity while the "old" error polarity is still passing through the delay unit. This normally implies a delay of at least one cycle of the input signal, since phase error measurements usually require the time interval covered by one cycle.

An output from AND gate 46 indicates a transition in phase error signal from large negative value to large positive value, or a negative frequency offset. This signal is summed into the VCO control input normally emanating from the low pass filter 37 by the combiner network 50, with a negative polarity, to reduce the VCO control voltage and thus its output frequency and the consequent frequency offset, thereby aiding the acquisition process. Similarly, an output from AND gate 45 indicates a positive frequency offset, i.e., that output occurs only for large positive to large negative phase error as illustrated in FIGURE 2(*a*), and is summed into the VCO control voltage with a positive polarity to increase the output frequency of the VCO. Here again, this results in a reduction of the frequency offset and an enhancement of the acquisiton range.

It should be emphasized that phase detector 35, in the embodiment of FIGURE 3, is of the conventional type having a linear transfer function to produce an output voltage which is large in the vicinity + and −pi radians, rather than of another common class of phase detectors whose output voltage approximates the sine of the phase error.

It should also be observed that the phase error waveforms such as those shown in FIGURE 2 can also be utilized to supply the magnitude of the frequency offset, in addition to the polarity of that offset. The time interval between transitions from large positive to large negative phase errors (or vice versa) is equal to the period of the difference frequency between the input signal and local reference frequencies. A measurement of this time interval provides a signal which may be used in conjunction with the error polarity signal developed as described above, to directly set the local reference to the incoming frequency, thereby further hastening the acquisition process.

It will be apparent that while we have disclosed a preferred embodiment of our invention, variation in the specific details of construction that have been illustrated and described may be resorted by a person skilled in the art to which our invention pertains, without departing from the spirit and scope of the invention.

We claim:

1. A phase lock circuit for incoming signal, comprising a controlled oscillator for generating a signal whose frequency is a function of the magnitude of a control signal applied thereto;

means for detecting the difference in phase between said incoming signal and the signal generated by said controlled oscillator, and for providing a control signal representative of said phase difference; said phase detecting means having a linear transfer function to generate an output signal having a magnitude proportional to the magnitude of the phase difference;

low pass filter means responsive to said phase difference signal for passage thereof according to the filter bandwidth;

means further responsive to said phase difference signal for detecting information therefrom indicative of frequency offset between said incoming signal and the signal generated by said controlled oscillator, including means for sensing the polarity of said frequency offset and for generating a signal representative thereof, and for modifying the magnitude of the phase difference signal passed by said low pass filter means in accordance with said information in a sense tending to reduce the frequency offset, including means for combining the signal representative of frequency offset polarity with the phase difference signal passed by said low pass filter means;

said means for sensing frequency offset polarity including means for detecting large negative phase errors and large positive phase errors, comprising a slicing network having a positive threshold and a slicing network having a negative threshold, said slicing networks coupled for parallel receipt of said phase difference signal from said phase detecting means; and means for detecting abrupt changes between said large positive and large negative phase errors, including a pair of delay networks, one responsive to signal from the positive slicing network and the other responsive to signal from the negative slicing network, each of the last-named signals indicative of phase difference exceeding the respective slicing network threshold, and a pair of AND gates, each for supplying an output in response to receipt of a signal from the slicing network in the opposite channel and the delay network in its own channel; and means for applying the modified filter phase difference signal to said controlled oscillator as the control signal therefor.

2. The combination according to claim 1 wherein each of said delay networks imparts a delay equal to at least the period corresponding to one cycle of said incoming signal.

3. The combination according to claim 1 wherein each of said delay networks has a delay time sufficiently short to prevent response of said AND gates to all but abrupt changes between large positive and large negative phase errors.

4. In a phase-locked loop having a phase detector for detecting the phase displacement between an input signal and a local reference signal generated by an oscillator controlled by the magnitude of the phase error control signal passed by a filter between phase detector and oscillator, the improvement comprising means for sampling the phase error control signal to detect phase errors of either polarity exceeding a respective predetermined threshold, means responsive to successive opposite polarity phase errors exceeding said threshold for detecting only abrupt reversal in error polarity, including means for sensing a predetermined time interval between occurrence of a sampled phase error of one polarity and conclusion of an immediately succeeding sampled phase error of opposite polarity, each exceeding said threshold, said time interval being sufficiently short to indicate an abrupt polarity reversal and sufficiently long to permit concurrent examination of consecutive sampled phase errors, and means responsive to abrupt reversal of error polarity as detected by said detecting means for appropriately varying the magnitude of the filtered control signal applied to said oscillator, in a sense tending to reduce the frequency offset between said reference signal and said input signal according to the direction of said abrupt reversal.

5. A phase lock circuit for reducing the frequency displacement between an incoming signal and a local reference signal, comprising a controlled oscillator for generating said local reference signal with a frequency as a function of the magnitude of a control signal applied thereto;

means responsive to said incoming signal and to said local reference signal for producing a signal representative of the phase difference therebetween;

filter means responsive to the phase difference signal for removing unwanted frequencies therefrom;

means responsive only to abrupt transitions in polarity of said phase difference signal to develop a supplemental control signal indicative of the sense of each transition;

means responsive to said supplemental control signal and to the output signal of said filter means for combining the two in a sense to produce a control signal tending to eliminate said frequency displacement; and means for supplying the combined signal to said controlled oscillator as the control signal therefor;

said supplemental control signal developing means including means responsive to said phase difference signal in excess of a predetermined absolute threshold level for producing signals respectively indicative of positive and negative excursions exceeding said threshold level, and means responsive to said positive and negative indication signals for detecting only substantially instantaneous changes of polarity of phase difference signal exceeding said threshold level and for producing said supplemental control signal only when said substantially instantaneous polarity changes occur.

6. The phase lock circuit according to claim 5 wherein said detecting means comprises a pair of gating circuits each responsive to concurrent application of positive and negative indication signals thereto for producing a respective supplemental control signal, means for supplying positive indication signal to one of said gating circuits and negative indication signal to the other of said gating circuits, and means for supplying a delayed replica of said negative indication signal to said one of said gating circuits and a delayed replica of said positive indication signal to said other of said gating circuits.

7. The phase lock circuit according to claim 6 wherein said means for supplying delayed replicas introduces into the respective signal a delay of sufficient length to provide concurrent application of positive and negative indication signals to one of said gating circuits when an abrupt transition has occurred and of sufficient brevity to prevent said concurrent application to one of said gating circuits except when an abrupt transition has occurred.

References Cited

UNITED STATES PATENTS

| | | | |
|---|---|---|---|
| 2,676,262 | 4/1954 | Hugenholtz | 331—17 X |
| 3,411,103 | 11/1968 | Deman et al. | 331—17 |

ROY LAKE, Primary Examiner

SIEGFRIED H. GRIMM, Assistant Examiner

U.S. Cl. X.R.

331—17, 18, 25